United States Patent [19]

Shriner et al.

[11] Patent Number: 5,322,043
[45] Date of Patent: Jun. 21, 1994

[54] SPIRAL SPIN CHARGE OR SHEATHING SYSTEM

[76] Inventors: Robert D. Shriner, 1021 East Orange; Rodney J. Lloyd, 316 West Sheila, #3, both of Santa Maria, Calif. 93454

[21] Appl. No.: 927,619

[22] Filed: Aug. 5, 1992

[51] Int. Cl.⁵ ..................... F02M 25/07; F02B 31/00
[52] U.S. Cl. ................... 123/295; 123/73 C; 123/306; 123/568; 137/808
[58] Field of Search ............. 123/295, 306, 430, 568, 123/73 C; 137/808

[56] References Cited

U.S. PATENT DOCUMENTS

| | | | |
|---|---|---|---|
| 3,340,854 | 9/1967 | Foster | 123/306 X |
| 4,104,989 | 8/1978 | Resler, Jr. | 123/430 |
| 4,135,481 | 1/1979 | Resler, Jr. | 123/568 |
| 4,196,701 | 4/1980 | Tamura et al. | 123/308 |
| 4,292,944 | 10/1981 | Matsumoto et al. | 123/432 |
| 4,313,410 | 2/1982 | Kunii et al. | 123/432 |
| 4,411,226 | 10/1983 | Okumura et al. | 123/188.14 |
| 4,413,593 | 11/1983 | Resler, Jr. | 123/1 A |
| 4,484,549 | 11/1984 | Yokoyama | 123/308 |
| 4,640,234 | 2/1987 | Olsson et al. | 123/557 |
| 4,721,126 | 1/1988 | Horii | 137/808 X |
| 4,760,821 | 8/1988 | Aupor et al. | 123/308 |
| 4,825,843 | 5/1989 | Novy | 123/585 |

FOREIGN PATENT DOCUMENTS 110814 7/1983 Japan.
1518560 10/1989 U.S.S.R. ................... 123/308

Primary Examiner—Tony M. Argenbright
Attorney, Agent, or Firm—Antonio M. Fernandez

[57] ABSTRACT

Apparatus for imparting a spiral spin on a fluid in zone 2 surrounding a columnar substance in zone 1 which may be a metal electrode or a fluid, such as gas for welding. The spirally spinning fluid may be an inert gas for sheathing zone 1 down to the welding site on a workpiece. For a four-stroke-cycle internal combustion engine, exhaust gas return (EGR) in zone 1 is sheathed from a fuel-air mixture in zone 3 by the spirally spinning fluid (fresh air) in zone 2. In a two-stroke-cycle engine, the spirally spinning fluid in zone 2 may be injected gas while the EGR is injected in zone 1. Fresh air, precharged in the cylinder at the end of the power stroke, constitutes zone 3. In either the four-stroke or two-stroke-cycle case, the spirally spinning fluid in zone 2 and the columnar EGR are positioned on the axis of the cylinder, and the spirally spinning fluid provides a blended mixture of air and fuel for combustion with a cylindrical flame front that progresses rapidly down around the column of EGR to the piston and from there radially out to the cylinder wall as the piston moves down in the power stroke.

23 Claims, 11 Drawing Sheets

COMPRESSION PISTON BDC

COMPRESSION 20° BTDC (BLENDING)

SPIRAL SPIN CHARGE OR SHEATHING SYSTEM

TECHNICAL FIELD

The invention relates in general to a device for imparting a spiral spin on a fluid for sheathing (enveloping) a stream of another fluid, such as in torch welding (or for sheathing a gap at the end of a rod, such as in arc welding) with an inert gas, and in charging cylinders of an internal combustion engine with fuel. In the latter application, the device is mounted at or near the fuel intake or injection port of a cylinder so that exhaust-gas-return (EGR) that is also to be injected will be enveloped by swirling fresh air or fuel to create a spiral sheath enveloping the EGR.

BACKGROUND OF THE INVENTION

The importance of this invention to internal combustion engines is self-evident. There is a continuing need to not only increase the efficiency of internal combustion engines for both motor vehicles and stationary loads but to also reduce emissions of air pollutants, particularly oxides of nitrogen (NOx). To meet this need, catalytic converters and stratified charge systems have been developed which require either sustained high exhaust temperatures (about 700° F.) or a constant load condition.

U.S. Pat. No. 4,104,989 discloses a stratified charge system in which a layer of air-fuel mixture is preformed between layers of fresh air in the part of the engine manifold that will charge the engine cylinder when the intake valve is opens. The result is a pocket of relatively fuel-lean, air-fuel mixture between layers of air. By stratifying the charge in that manner, the total quantity of air can be adjusted independently of the adjustment for the quantity of air-fuel mixture in order to minimize the formation of NOx and CO.

U.S. Pat. No. 4,135,481 discloses the same stratified charge system in which the air-fuel mixture is diluted with EGR before preforming the alternate layers of air and air-fuel mixture to further control NOx pollution.

U.S. Pat. No. 4,413,593 discloses a variation of the prestratified charge system in which the EGR accumulates near the intake valve while it is closed. When it opens for the intake stroke, the first portion of the charge to enter the cylinder is EGR followed by diluted air-fuel mixture. The layer of EGR remains stratified next to the piston during the compression stroke so that during the power stroke the tendency for air-fuel mixture to preignite at the piston before the flame front reaches it from the spark plug, a condition known as engine knock which imposes a limit on increase of the piston compression ratio for engine efficiency. This technique for stratification of EGR next to the piston during the intake stroke allows increase of the compression ratio of an engine for greater efficiency without risk of engine knock under high load conditions.

From the foregoing, it can be fully appreciated that for optimum reduction of emissions of air pollutants with a catalytic converter in the exhaust passageway, sustained high exhaust temperature is required, and with a stratified charge system a constant load condition is required unless expensive auxiliary rate of flow equipment is installed. Thus limited, neither system fully meets the need to reduce emission of pollutants. In fact, there are circumstances under which both catalytic converters and pre-stratified charge systems still do not fully satisfy the need, as in the case of cold starts.

Efforts to more fully satisfy this need to reduce NOx as well as other emissions, namely CO and HC, have met with well documented stoichiometric curve ratios associated with the power efficient air, fuel and airfuel mixtures, even with homogenous mixtures that include dilute EGR. These "classic" stoichiometric curves have been accepted as being bound by laws of physics, i.e., virtually unchangeable. However, tests of the present invention referred to hereinafter as a cylinder charge system (CCS) have proven that an engine equipped with the CCS system may achieve a better performance that is not restricted to the classic stoichiometric curves without relying on moving parts or catalytic conversion of exhaust gases. In other words, it has been found that reduction of oxides of both nitrogen and carbon by this invention falls outside the "classic" stoichiometric curves, and thus lends impetus to the statement that the invention does change the "classic" physics of the internal combustion engine by changing the shape of the flame front from a progressing bell shape to an expanding cylinder shape along the cylinder axis as the variable length of the cylinder increases during the power stroke.

STATEMENT OF THE INVENTION

In accordance with the present invention in its broadest aspects, a spiral spin is imparted to a second fluid caused to flow around a first fluid, thus sheathing the first fluid for controlled blending and redistribution of fluids, not only for exothermic reactions but also for endothermic reactions, or for mixing and redistribution of nonreactant fluids, any of which fluids may include particulate matter in suspension, for example, coal dust or graphite. The spiral spinning fluid generates a cylindrical sheet forming a boundary between fluids where blending of the fluids takes place, the rate of which depends on the size of the spin radius. The length of the cylindrical sheet can be controlled by the velocity of injection, including pulsating injection, of the spiral spinning fluid, as well as by the size and geometry of the injecting port or ports. Instabilities associated with any pulsation of the injection may provide some benefit, depending upon the specific application of the invention.

For many applications, a flow of one injected fluid may be surrounded by a spiral spinning second fluid in order to sheath the one fluid with the second one. This is accomplished by establishing a spiral passageway in the injection path for the second fluid and a coaxial tube for the first fluid. The first fluid flowing out of the coaxial tube is thus sheathed by the spiral spinning fluid flowing out of the spiral passageway. The coaxial tube for the first fluid may be made with an internal spiral ridge in order to impart a spin of the first fluid enveloped by the spiral spinning second fluid. If the direction of spin is the same for both fluids, mixing of the fluids at their common boundary is minimized, and the effect that the spin of both fluids will have in positioning the coaxial fluids along a path of progression may thus be enhanced.

In particular applications, a third coaxial fluid may be introduced through a passageway around the tube for the second fluid so that as the second spirally spinning fluid emerges from its tube, it is in turn surrounded by the third fluid. One such particular application is a cylinder charge system for a four-stroke-cycle internal combustion engine achieved by a device for each cylinder (which may or may not have moving parts) placed in the intake passageway for the air-fuel mixture at or very near the intake port of the cylinder.

The device comprises a fresh-air intake conduit coaxially positioned in the intake passageway of that air-fuel mixture so that the air-fuel mixture flowing through the intake port envelops the flow of fresh air emerging from the conduit. A coaxial tube within the fresh-air conduit is supplied with a flow of EGR. A spiral channel formed in the space between the EGR tube and the fresh-air conduit creates a spiral spin in the fresh air flowing around the EGR out of the tube and into the engine cylinder. At the same time, EGR may be caused to flow out of the axial tube with a spin imparted to it by an optional spiral ridge formed on the inside wall of the tube. The air-fuel mixture flow from an intake manifold during an intake stroke envelops the coaxial fresh air and EGR. As the coaxial EGR, fresh-air and air-fuel mixture pass through the intake port, the spiral spin of the fresh air (aided by any spin imparted to the EGR) seeks the position of least resistance to the spin and thus progresses to position its spin axis on the axis of the cylinder to produce a noncombustible zone from the top of the cylinder down to the piston along the axis of the cylinder. Even before the piston begins a compression stroke, the fresh-air and air-fuel mixture begins to blend at their interface so that as the piston does compress the cylinder charge, and reaches a position near top dead center (e.g., 20° before TDC), a lean air-fuel mixture will be present in the dome of the piston cylinder ready for ignition when the cylinder spark plug fires at, for example, 6° to 8° before TDC.

When the air-fuel mixture is ignited, the noncombustible zone within the edge blend area deflects the flame front along a path that is defined by its own condition of best burn, which is radially outward as the piston moves toward bottom dead center (BDC) during the power stroke, thus producing an expanding cylindrical-shape flame front, even as the piston moves during the power stroke. But even before ignition, the spirally spinning fresh air and EGR begin to blend at their interface while the nonrotating air-fuel mixture blends with the spirally spinning fresh air at their interface. This blending presents a full scale of nonhomogeneous mixtures to the flame ranging from pure EGR in the center along the axis of the cylinder through spirally spinning fresh air to the full air-fuel mixture for more efficient operation of the engine due to the added control of the flame front during the power stroke. A conventional exhaust stroke follows.

In some internal combustion engines, such as a two-stroke-cycle engine, the fuel is introduced through a spiral passageway around a tube through which a column of EGR is injected along the axis of the cylinder. Fresh air is first introduced into the cylinder through a port on one side while exhaust is swept out through a diametrically opposite port, and then during the compression stroke the spiral spinning fuel and column of EGR is introduced. This then is injected into the cylinder. As the column of EGR is compressed, the spiral spinning fuel blends with the air already present in the cylinder. The columnar fuel and EGR zones expand and the resultant blend progresses from the cylinder axis out exposing to the ignition source, i.e., spark plug, a variety of air and fuel mixtures of the second zone as it edge blends with fuel (gas) in the third zone. The flame front progresses not downwardly as a balloon expanding from the top down, but rather along the path of best combustible mass thus forming a columnar flame front that expands radially, both outward and inward, along the entire axis of the cylinder as the piston progresses toward bottom dead center (BDC).

For industrial applications, a spiral spin device may be used for sheathing in a similar way by producing a spiral spin of fluid in a second zone surrounding a first zone extending along the axis of the spiral spinning fluid. The second zone thus isolates the first zone from a third zone that surrounds the second zone which, in most industrial applications, is the surrounding atmosphere. Industrial applications include welding, where the first zone provides a heat source such as: (1) a metal rod (in some cases a tungsten rod) for arc welding; (2) a beam, such as a laser beam, electron beam or particle beam; or (3) a combustible gas. By using an inert gas, such as argon, for the spiral spinning fluid in the second zone, the point or site of the weld is isolated from the surrounding area.

Other industrial applications for a spiral spin device will occur to those skilled in the art, such as acetylene torch welding or cutting. The advantage is spiral sheathing for shielding the flame to its tip, and by increasing the pressure of the inert gas forced through the spiral spin device, it is possible to have the flame tip extended from the end of the spiral spin device some greater distance. Another advantage is that particulate matter may be introduced at the welding or cutting site through mixture of particulate matter in the spiral spinning gas in the second zone, such as particles of coal dust or carbide to increase the hardness of metal in the weld or the hardness of the edge of metal being cut, such as in cutting a plow blade from shaped metal.

The novel features that are considered characteristic of this invention are set forth with particularity in the appended claims. The invention will best be understood from the following description when read in connection with the accompanying drawings.

DESCRIPTION OF PREFERRED EMBODIMENTS

The concept of "spiral sheathing" or "spiral enveloping" evolved out of an understanding of the known physical conditions associated with the naturally occurring phenomena of a cyclone. A difference in pressure creates a movement of a gaseous or vaporous media (with or without particulate matter suspended in the media) as it seeks to equalize that pressure. If channeling occurs, then a spin condition may also occur due to friction along the edge of the channel.

Figure 1A:
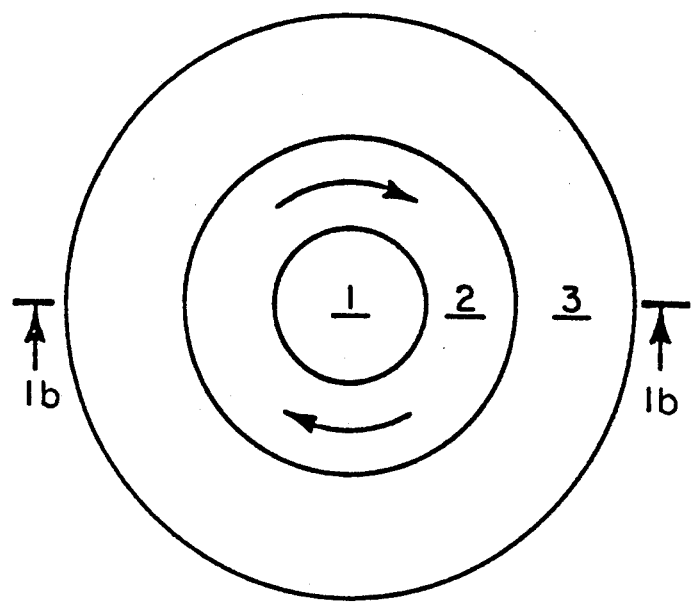
FIG. 1a and FIG. 1b illustrate diagrammatically horizontal and vertical cross sections, respectively, of a spiral spinning zone 2 around a columnar zone 1 which has no spin. Zone 2 sheaths zone 1 from zone 3 which surrounds the spiral spinning zone 2.
Figure 1B:
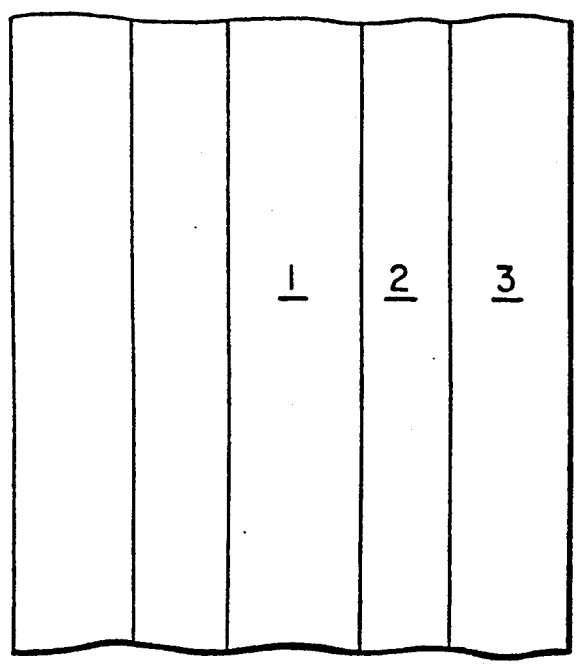

Three distinct zones are established in this spiral spin sheathing condition, as shown in FIG. 1a, a horizontal cross section of a fluid spinning about its vertical axis. Zone 1 at and immediately around the axis of the spiral sheath in zone 2 is columnar in shape and has no spin. Zone 2, to which spin is imparted, is tubular in shape. It sheaths the axial column, i.e., completely surrounds fluid in zone 1 (or a solid as in arc welding or a selected one of an oxidizer reactant as in thrust producing applications) even as the spiral sheath axis moves along a line of progression. Zone 3 is that which surrounds the spiral sheath in zone 2, i.e., is that which extends outwardly away from the spinning second zone. It has no spin energy associated with it. Thus, zone 1 is completely isolated from zone 3, as shown in FIG. 1b in a cross section taken along a line 1b—1b in FIG. 1a.

It has been discovered that the concept of "spiral sheathing" may be used for industrial applications by, for example, development of a second zone of inert gas spinning around a column of flammable gas in a first zone to purposely isolate a flammable, or combustible gas in the first zone from a potentially hazardous condition at some point if large quantities of the gas in the first zone were to be allowed to mix with, for example, ambient air in the third zone.

This shielding condition could be established over a required distance, such as in torch welding, and would degenerate over an extended distance and time which can be controlled by controlling the spin energy imparted to the gas in the second zone. Alternatively, this spiral sheathing process may be developed and targeted to a specific location, such as a spinning zone surrounding a rod in arc welding where, as would be the case of a spiral sheathing inert gas (e.g., Argon), a beneficial reduction in the oxidation and contamination of surrounding components is achieved. For example, in field-resistance arc welding for repair of electronic equipments, such shielding is needed in order to make repairs without removal of the electronic unit being repaired to an argon flooded chamber maintained exclusively for such repair work.

The development of a second zone of spinning gas, vapor, or combination of spinning fluids (gases or vapors), including fluids with uniformly distributed particulate matter in various combinations, establishes a means by which control of the shape and the intensity of a flame front can be achieved. This also holds true when a flammable gas or vapor is introduced in the first zone, and the spiral spinning gas or vapor in the second zone contains a variable amount of oxidizer; then control of the shape, intensity and velocity of the flame front occurs when ignited.

Such means for control of the flame front is useful in an internal combustion engine. After introduction into the combustion chamber on the intake stroke, and after isolation from the source of the spiral spinning charge of gases or vapors, the spin energy continues during the compression stroke and begins to deteriorate, but not before a beneficial condition is established within the internal combustion engine cylinder that reduces the development of oxides of nitrogen and of carbon in the exhaust gases. Thus, toxic emissions of NOx and CO can be controlled at the source, i.e., in the internal combustion engine cylinder. This reduction of toxic emissions at the source reduces the potential for leaking emissions from the exhaust manifold and pipe to the catalytic converter and for possible reduction in effectiveness of the converter by contaminants, or as in the case of cold starts, insufficient heat being available for the catalytic conversion process.

Figure 2:
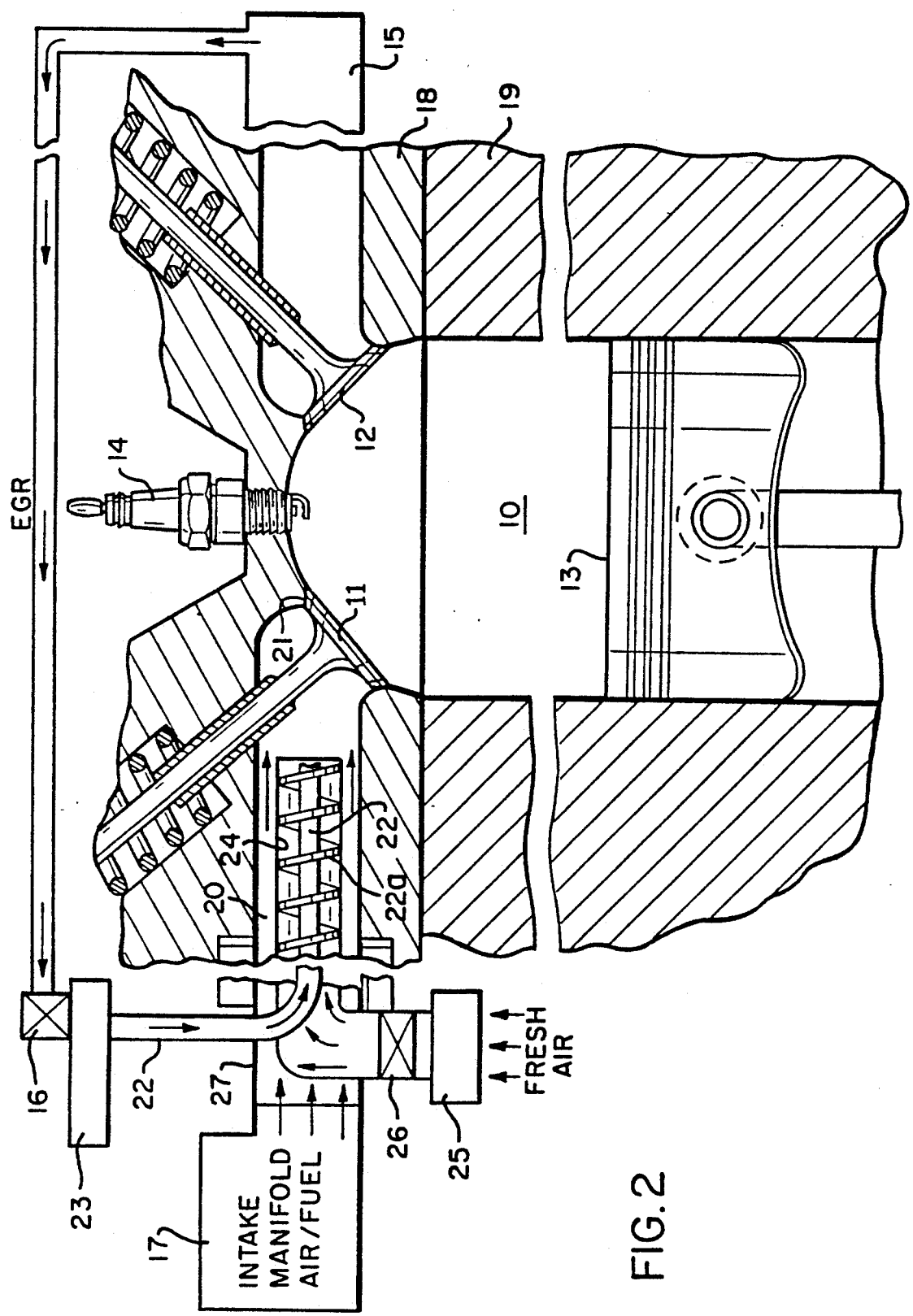
FIG. 2 illustrates one cylinder of a four-stroke cycle internal combustion engine with the intake and exhaust manifolds, passageways, valves and a spark plug. Within the intake passageway is a coaxial conduit with an auger-like screw for imparting a spiral spin on auxiliary fresh air and an EGR inlet tube from the exhaust manifold.

Referring to FIG. 2, a single cylinder 10 is shown schematically for a conventional four-stroke-cycle gasoline engine of the spark-ignition type with an intake valve 11 and an exhaust valve 12, both shown closed. The piston 13 is shown between bottom-dead center (BDC) and top-dead center (TDC) during a compression stroke following an intake stroke. A spark plug 14 ignites the fuel air mixture at a predetermined point before TDC. As the piston nears the end of the ensuing power stroke, the exhaust valve 12 is opened, and it remains open during the return exhaust stroke to force the remainder of the combustion products out of the cylinder and into an exhaust manifold 15.

Part of the combustion products are normally returned through an exhaust gas return (EGR) valve 16 to the cylinder 10. This is normally done by connecting the EGR valve to the intake manifold 17 through passageways in the cylinder head 18 that is bolted to the cylinder block 19, but in accordance with the present invention, the EGR valve is connected to a separate device provided for each engine cylinder which form a cylinder charge system (CCS) for the engine. The CCS device shown in FIG. 2 for one cylinder will now be described.

Figure 3A:
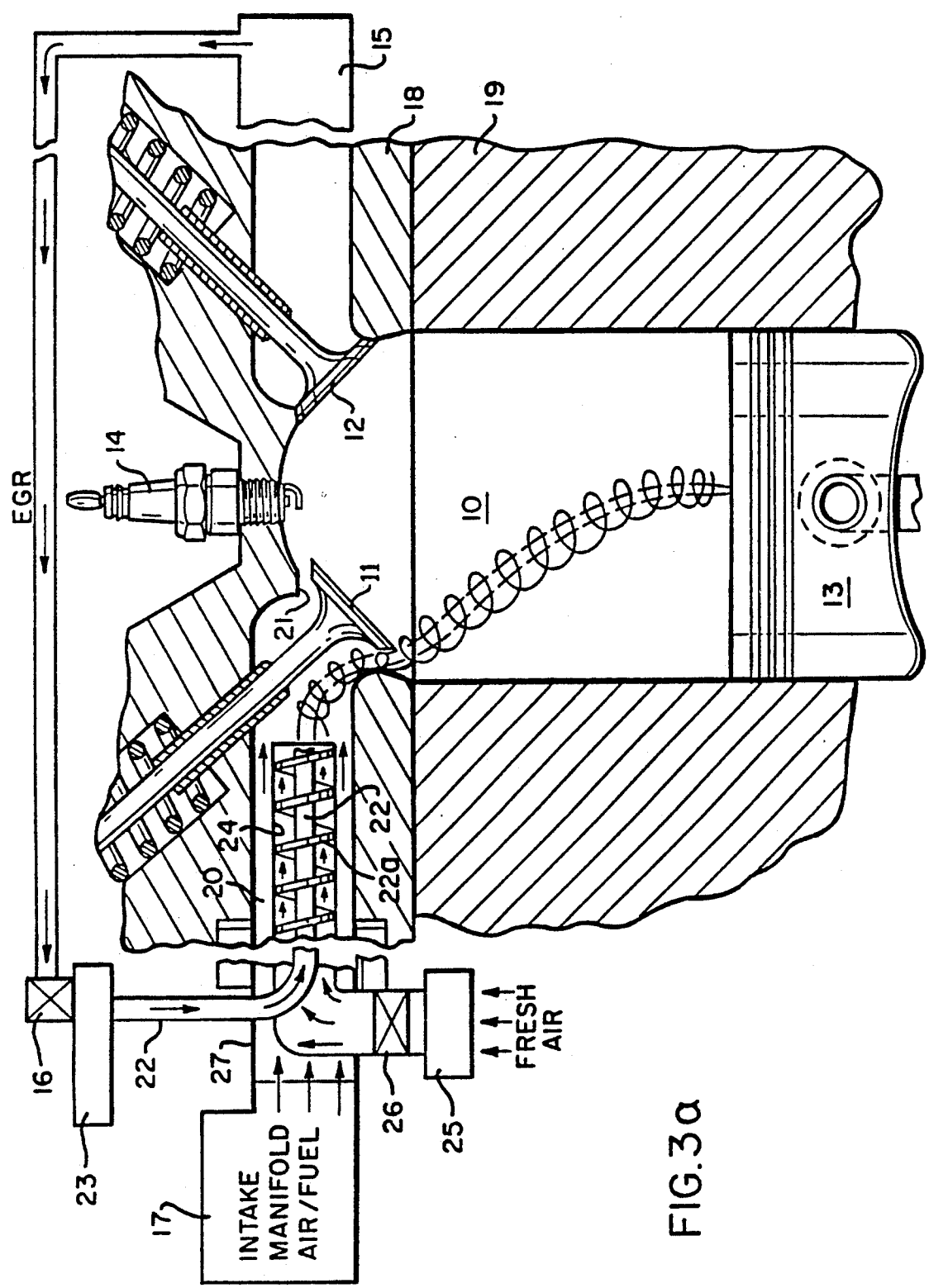
FIGS. 3a, 3b and 3c illustrate initial charge of the cylinder shown in FIG. 2 while the intake valve is open; centering of the charge after the intake valve closes; and compression of the charge just prior to the spark plug firing, respectively.

The intake manifold 17 delivers an air-fuel mixture to the cylinder 10 through the CCS device past the open intake valve (as shown in FIG. 3a). The CCS device is inserted into a passageway 20 in the cylinder head 18 that leads to the intake port 21 shown open during the intake stroke. The CCS device is comprised of a tube 22 a part of which is in the passageway 20. The other part is connected to the EGR valve 16 to deliver EGR to the port 21. This connection may be made by providing an EGR manifold 23 and a separate tube 22 for EGR from the manifold 23 for cylinder CCS device.

The part of the EGR tube 22 that extends into the passageway 20 is coaxially positioned in a conduit 24 by a spiral fin 22a formed as an integral part of the tube 22. That tube with a spiral fin may be aptly described as an auger-like hollow screw press fitted into the conduit 24. The result is a spiral channel for fresh-air intake via a filter 25, which may be coupled to all CCS devices by a manifold and a flow control adjustment valve 26 which may also be common to all CCS devices.

The intake manifold 17 for the air-fuel mixture from the engine carburetor is coupled to the passageway 20 by a fixture 27 which may be attached to the cylinder head 18. The intake air-fuel mixture flows around the conduit 24 and emerges near the intake port 21. There it envelops spirally spinning fresh air produced by the spiral channel in the fresh-air conduit 24. At the core of the charge into the cylinder comprising the spirally spinning fresh air and enveloping air-fuel mixture is a flow of EGR.

In summary, within the vapor space of the intake manifold 17, and between the carburetor (not shown) and the intake valve 11, is placed a CCS device comprised of a conduit 24 and coaxial tube 22 having a spiral fin 22a resembling a deeply fluted hollow screw. This conduit and fluted screw assembly provides an auxiliary fresh-air inlet with rate of flow controlled in response to a change in absolute pressure in the intake manifold 17. This rate of flow is frictionally resisted due to the length of travel along the fluted screw, and thus the rate of change of flow lags behind a vacuum draw increase and leads a vacuum draw decrease associated with the intake valve opening, and each net change in loading (vacuum draw) of the engine.

The auxiliary fresh air is drawn by vacuum into the intake port 21 through the deeply fluted screw and is thus caused to spin on discharge into the port 21. This spin energy establishes a spirally spinning cylinder of auxiliary fresh air that envelopes auxiliary flow of EGR from the exhaust manifold 15. This spirally spinning auxiliary air enveloping EGR retains its coaxial form due to the spin energy supported by spiral spin physics associated with a differential in absolute pressure while being drawn into the cylinder 10 through the port 21 during the intake stroke of the four-stroke-cycle engine and seeks to position itself on the axis of the cylinder 10 due to the physics of seeking the path of least resistance to the spin.

Figure 3B:
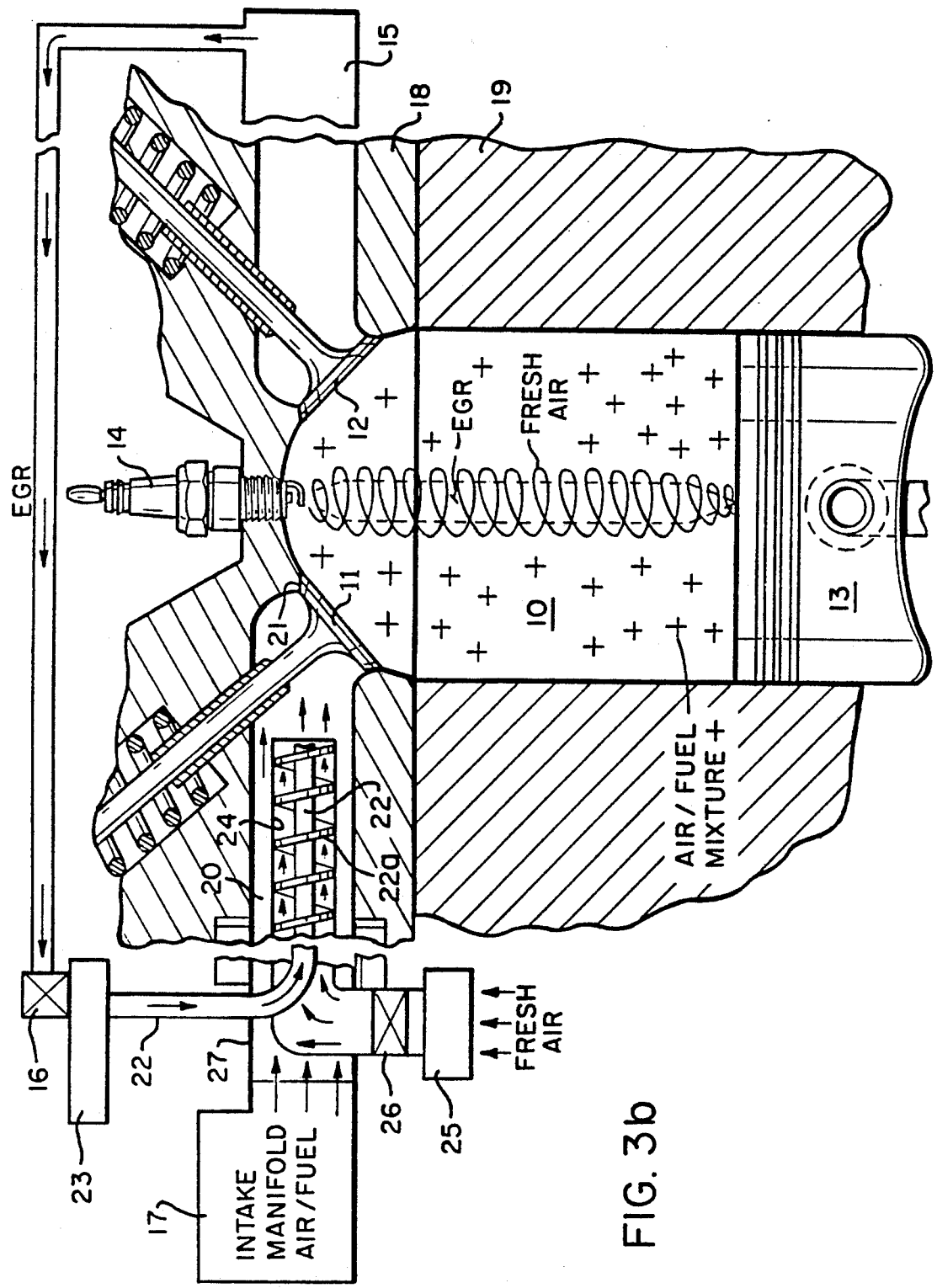
Figure 3C:
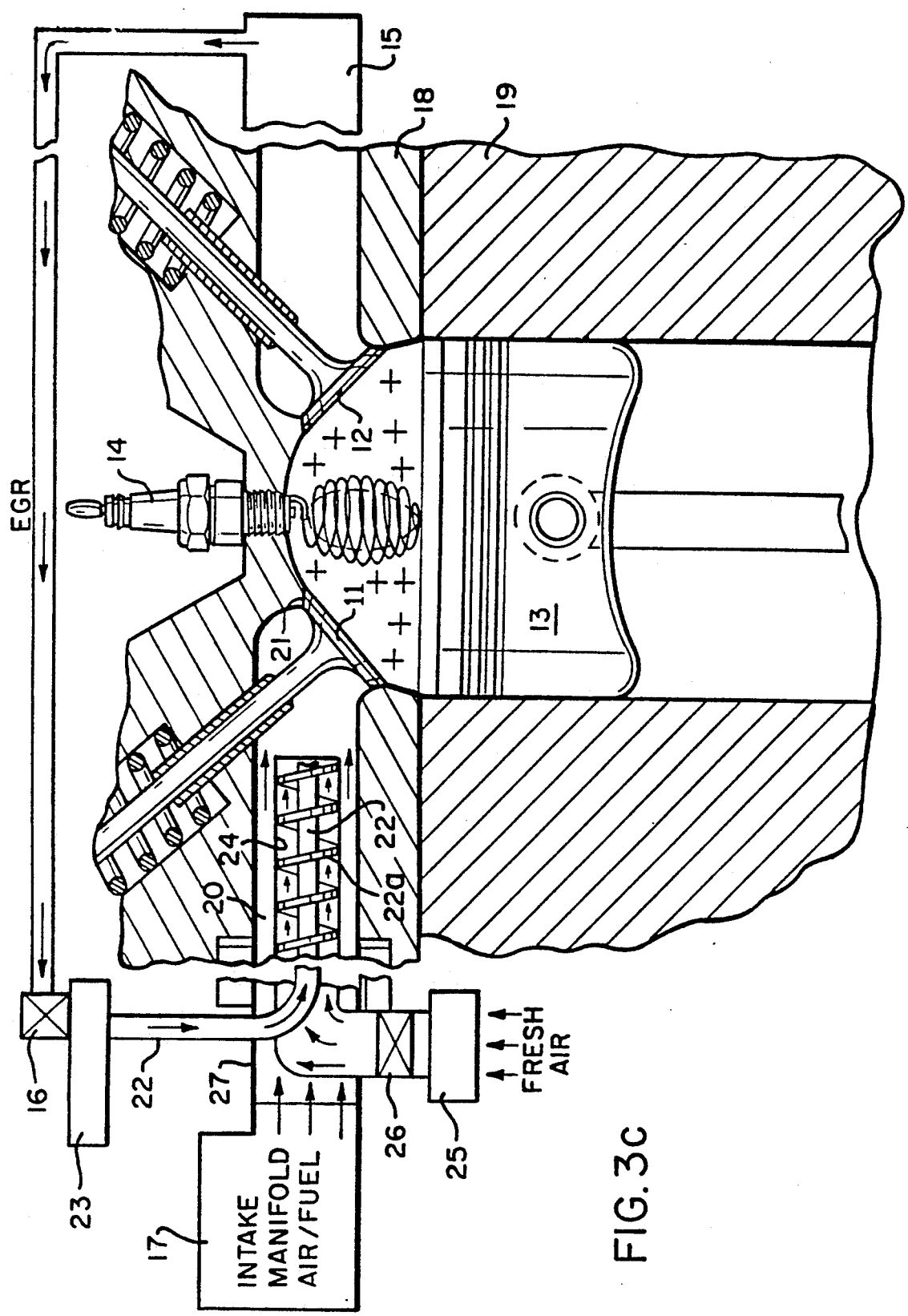

The spiral spin of the fresh air causes all coaxial components of the cylinder charge to seek the position of least resistance to the spin on entering the cylinder through the port 21, as shown in FIG. 3a. When the intake valve 11 closes, the coaxial components of the charge establish a noncombustible zone centered along the axis of the cylinder from the top of the cylinder 10 down to the piston 13, as shown in FIG. 3b, with the core of EGR at the center of the swirling fresh air. The air-fuel mixture surrounds this noncombustible zone, but even before the piston begins to compress the components, the fresh-air and air-fuel mixture begin to blend at their interface. The blending progresses as the piston compresses the spinning cylinder charge so that when the piston reaches a position near TDC (e.g., 20° before TDC), as shown in FIG. 3c, and well before the spark plug fires, a lean air-fuel mixture will be present in the dome of the cylinder 10. This blending presents a dynamic full scale of mixtures from the column of pure EGR gas at the center through the spirally spinning fresh air and the fresh-air/air-fuel blending zone to the full air-fuel mixture.

Full flow rates of the EGR, the fresh air surrounding the EGR, and the air-fuel mixture surrounding the fresh air are inhibited differently due to different coefficients of drag over the CCS device components. This creates an average flow rate of spirally spinning fresh air and EGR that lags behind the initial flow of carbureted air-fuel mixture into the cylinder and leads the rates of the air-fuel mixture on the closure of the intake valve. This lag/lead averaging of flow rate serves to lean out the air-fuel mixture when the average load decreases and to enrich the mixture when the average load increases, thereby averaging dynamic pressure with each cycle. Thus, a dramatic reduction of NOx and CO occurs in a manner that is without any moving parts or add-on sensor and response mechanisms, computers, diaphragms, or motor valves of any kind.

The spin energy begins to degenerate as a function of time and resistance and thus begins to edge blend with the normally carbureted air-fuel mixture also drawn into the cylinder 10 during the intake stroke. The spirally spinning auxiliary fresh air and the EGR extend from the top of the cylinder 10 to the top of the piston 13 which then begins its compression stroke. At a point before TDC, an ignition source is supplied by the spark plug 14 to cause a burning of the air-fuel mixture. Without the auxiliary fresh-air and EGR column, this flame front progresses radially outward from the point of ignition. The feature of this invention of columnizing the auxiliary fresh-air and EGR from the top of the cylinder to the top of the piston seeks to greatly modify the shape of this flame front by establishing a nonburning zone (column of fresh-air and EGR) on the axis of the cylinder and also by presenting to the progression of the flame a variety of air-fuel mixes that varies from pure EGR gases through fresh air and through a blended zone of fresh-air and air-fuel mixture, then into the normally carbureted air-fuel mixture. This variety of mixes allows the flame front to seek its own best path (least mass) which will now take the form of an enlarging column confined by the cylinder. Initially, the flame front will progress along its own best mix path associated with the blended zone (column) of EGR/fresh-air/air-fuel mixes and will progress to reach the top center of the piston and top center of the cylinder before extending out to the cylinder wall. This columnized flame front then progresses radially outward from the column while the pressure of the ignited fuel drives the piston down during the power stroke. Although some turbulence can be expected as a result of variations in engine type, design or fuel density, the reductions in emissions still occurs. The following Test results show this very dramatically.

TEST #1
Bare Engine

|   |   |
|---|---|
| NOx | 1175 ppm |
|   | 1.35 # per hr per hp |
|   | 489 @ 15% O$_2$ |
| CO | 600 ppm |
|   | .42 # per hr per hp |
|   | 249 @ 15% O$_2$ |
| TEST #2 | |
| Spiral Spin Charge System Installed | |
| NOx | 29 ppm |
|   | 0.05 # per hr per hp |
|   | 14.77 @ 15% O$_2$ |
| CO | 291 ppm |
|   | .29 # per hr per hp |
|   | 154 @ 15% O$_2$ |

This shows a 97.4% reduction in NOx and a better than 50% reduction in CO over the same carbureted engine with factory tune and the same load, RPM, timing, fuel pressure and air flow rates. In fact, a reduction in RPM was required to maintain a true equivalence to the normally aspirated engine values.

Figure 4:
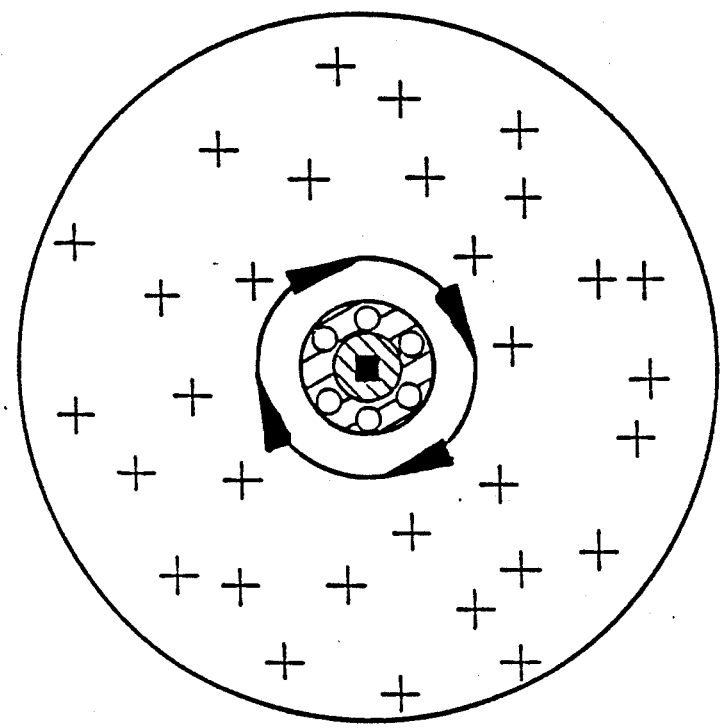
FIG. 4 illustrates schematically a cross section of the cylinder shown in FIG. 2 after the cylinder charge is positioned along the centerline axis of the cylinder with the piston at BDC.

FIG. 4 illustrates schematically in a cross section at the middle of the cylinder the position of the spiral spin charge with the piston at BDC. The cross-hatched center 30 represents the EGR, and the circle with arrows represents the outer limit of the spirally spinning fresh air. The air-fuel mixture is in the area filled with plus (+) marks. As noted above, there is some edge blending already present, but this rather idealistic diagram illustrates well the starting point for the process that is to take place during the following compression and power strokes.

Figure 5:
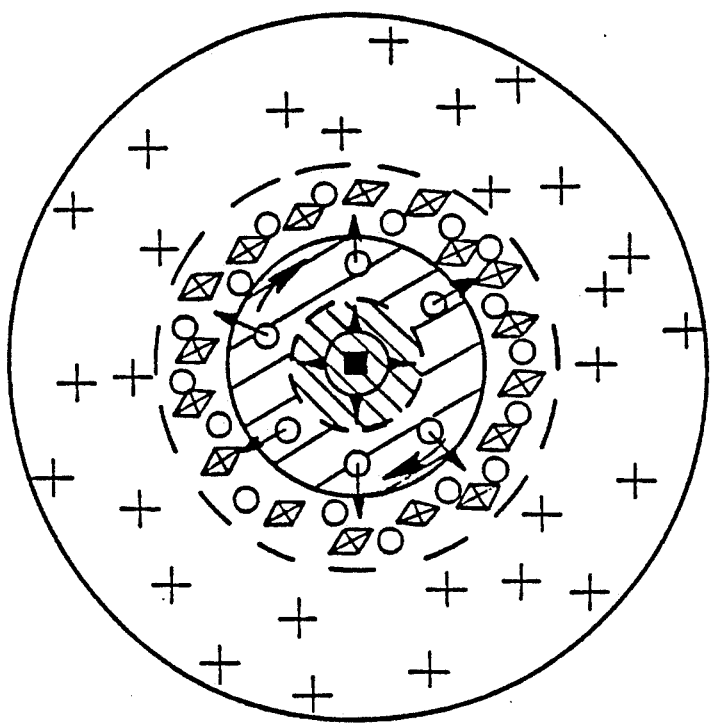
FIG. 5 illustrates schematically edge blending zones established after the cylinder charge has been in place in the cylinder just prior to and during ignition.

FIG. 5 illustrates the state of blending at the midsection of the cylinder with the piston at about 20° before TDC during the compression stroke. The plus (+) marks again represent the air-fuel mixture and the cross-hatched circle with a square in the center represents the expanding EGR. The area within a larger circle that is cross hatched and filled with clear circles represents the blending of EGR and fresh air while the area within a still larger circle with crossed diamonds and clear circles represents blending of fresh air and some traces of EGR with air-fuel mixture. These circles become smaller at positions closer to the dome of the cylinder, as may be appreciated from FIG. 3 when it is considered that compression has begun for the condition shown in FIG. 5. Consequently, there is a combustible blend of air-fuel and fresh air at the dome for ignition by the spark plug firing at a predetermined point before TDC.

Figure 6A:
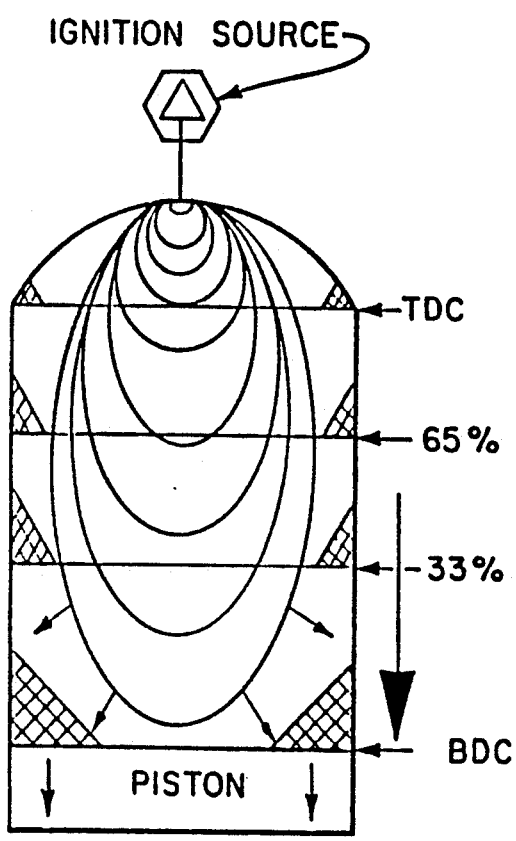
FIG. 6a depicts the flame front at successive stages after ignition of a classic burn progression.

FIGS. 6a illustrates the classic flame front on firing of a cylinder filled with uniformly mixed EGR and fuel-air mixture. When the spark plug fires, the burn front begins near the spark plug, as represented by a small circle that enlarges as the burn progresses into an elliptical burn front as the piston is driven from TDC to BDC. The cross-hatched corners at each stage of the piston power stroke represent the accumulation of hydrocarbons, which are indicative of the inefficient burn taking place. These hydrocarbons are pollutants that must then be converted by a catalytic converter. The larger area at each stage not cross hatched is, of course, filled by gasses to be exhausted that contain NOx and CO.

Figure 6B:
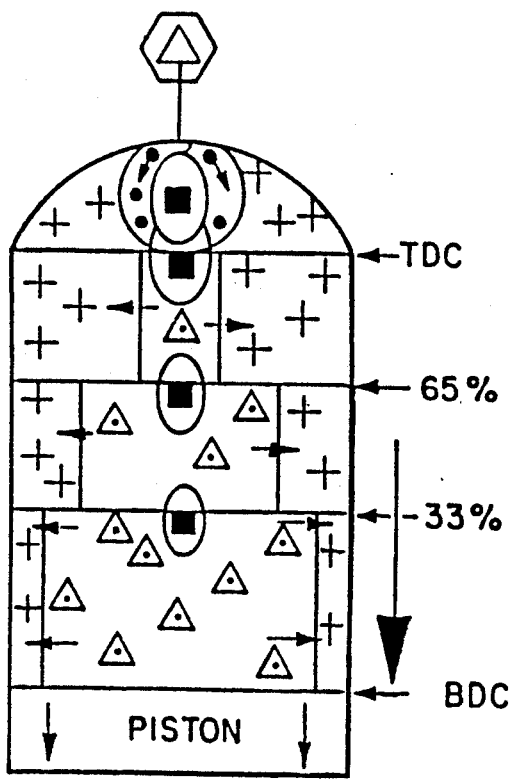
FIG. 6b depicts the flame front at successive stages of progression after ignition of the cylindrical burn pattern for the spiral spinning charge of FIGS. 2-5.

FIG. 6b then illustrates the burn front of a cylinder equipped with a CCS device as it burns through successive stages (positions of the piston) during a power stroke. As the piston is driven toward BDC, the blended air-fuel mixture burns progressively in radial directions from the axis of the cylinder without leaving corners of hydrocarbons and with a more efficient burn to leave less NOx and CO to be emitted in the exhaust gas.

Figure 6C:
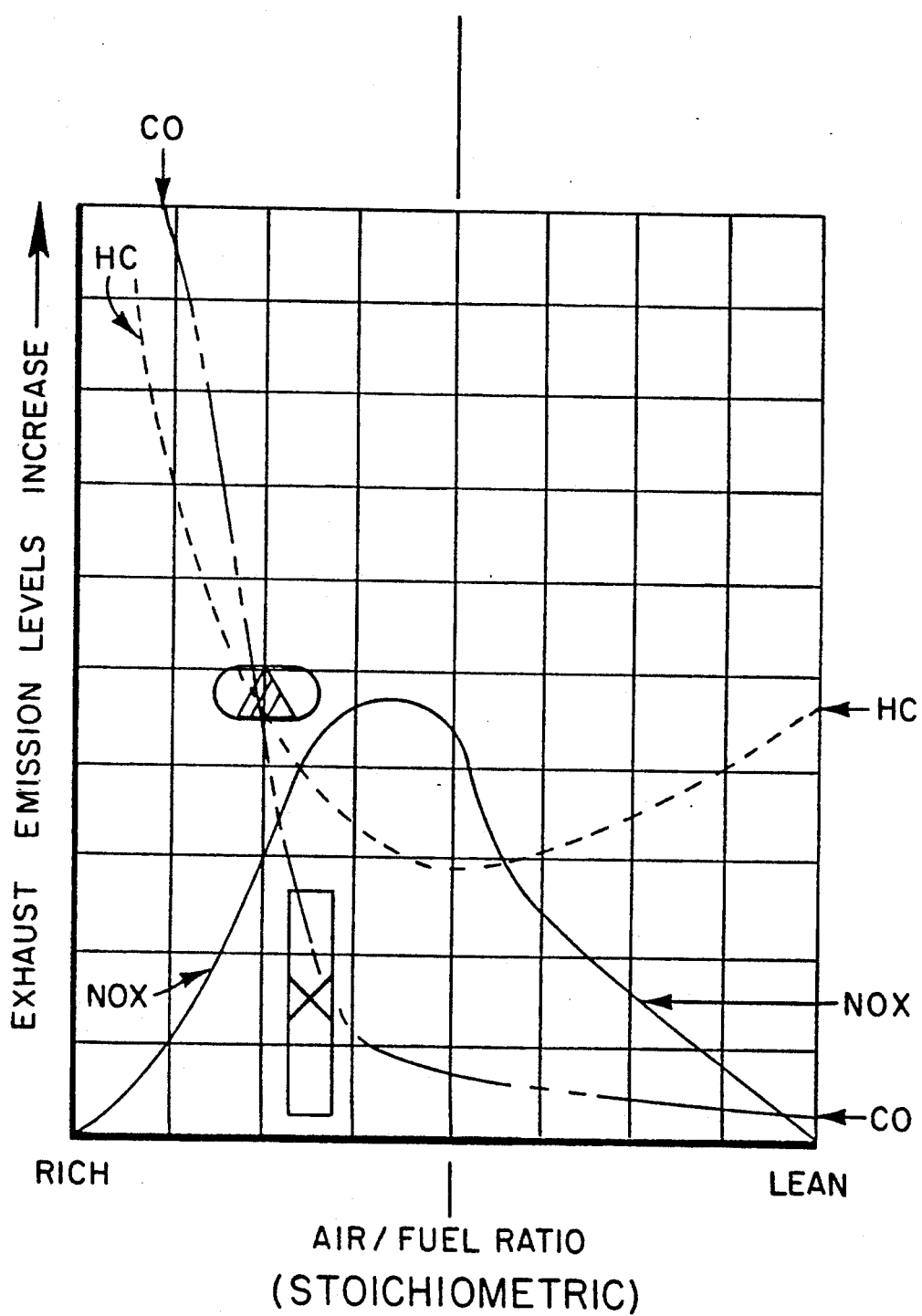
FIG. 6c is a graph of exhaust emission levels as a function of air/fuel ratio of a cylinder having a flame front progression shown in FIG. 6b, where actual air-fuel test results are plotted on a graph of the classic stoichiometric ratio curves.

Projecting results of Test #2 noted above upon a graph of expected results associated with physics of a burn with prior-art homogenous air/fuel ratios shown in FIG. 6c produces a zone of activity of this invention that is not allowed by the simple introduction of fresh air and EGR for uniform mixture with fuel. According to the stoichiometric curves of FIG. 6b and the accepted classical physics of the burn, the introduction of auxiliary air cannot cause the simultaneous reduction of NOx and CO emissions without the basic and classical physics of the burn having been changed as this invention does.

In FIG. 6c a triangle indicates the test results of an engine factory tuned for operation with natural gas fuel. The measured parameters are as follows:
NOx—1175 ppm
CO—600 ppm
Fuel—14.59 scfm An X indicates the test results of the same engine factory tuned but equipped with the CCS of the present invention. The rectangle around the X indicates the zone of activity of the CCS in respect to measured NOx and CO for varying loads, and the X in the rectangle indicates the specific test results achieved under the same load conditions as the test engine without the CCS. The measured parameters were as follows:
Nox—29 ppm
CO—300 ppm
Fuel—13.24 scfm The CCS not only achieves more efficient operation, as indicated by the decrease in fuel rates, but also produces significantly less emission of NOx and CO pollutants.

Figure 7:
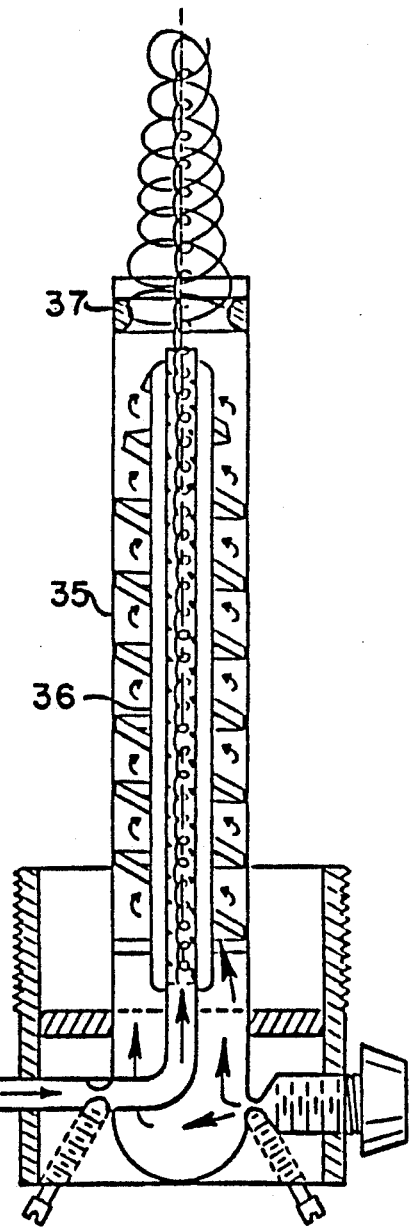
FIG. 7 illustrates a second embodiment of a cylinder charge system device for enveloping exhaust gas return (EGR) with a spiral spin mechanism in the EGR tube and a venturi at the exit of the coaxial EGR column, and spirally spinning fresh air introduced through a conduit to be placed in a cylinder intake passageway.

FIG. 7 illustrates a second embodiment of the invention in which EGR flows from the exhaust manifold as before, but through a valve 31 for adjusting the EGR flow rate to the cylinder. A valve 32 is provided for adjusting the fresh-air flow rate from a filter 33. Vertical struts 34, and similar horizontal struts are provided to strengthen the support of the conduit 23 at one end. All of the foregoing are merely modifications of the first embodiment. Added in this second embodiment are (1) a spiral ridge within the EGR tube 35 to impart a spiral spin to the EGR and (2) a venturi 36 at the outlet end of the EGR tube 35 to enhance spin energy of the spiral column of fresh air and EGR at the center axis of the cylinder for better ignition and combustion when the spark plug fires. The spirally spinning column of EGR enhances the spirally spinning column of fresh air so that EGR will not impede the spiral spin energy due to drag. That then will enhance the positioning of EGR and coaxial fresh-air and air-fuel mixture on the axis of the cylinder when the intake valve closes prior to the compression stroke.

Figure 8:
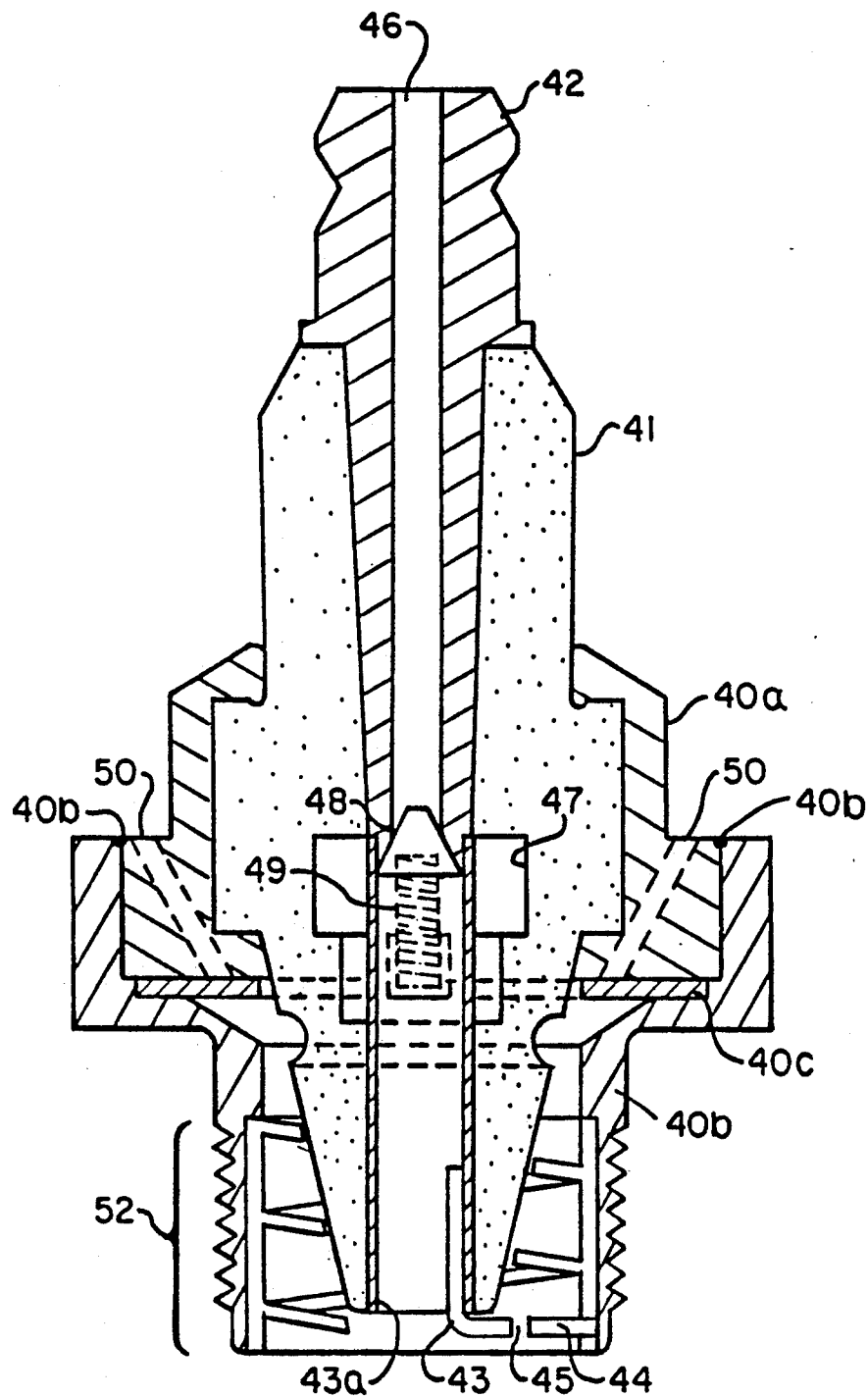
FIG. 8 illustrates another embodiment of a cylinder charge system device incorporated into the structure of the spark plug for the cylinder.

FIG. 8 illustrates a third embodiment of the invention in which a CCS device is incorporated into a spark plug which is conventional in its basic architecture in that it employs a metal shell (40a, 40b), a porcelain insulator 41, an ignition connecting rod 42, a center electrode 43, a side electrode 44 and a gap 45 between electrodes 43 and 44. A platinum or equivalent sleeve 43a extends from the tip of the porcelain insulator 41 to the ignition connecting rod to provide an electrical connection between the electrode 43 and the connecting rod 42. The metal shell is fabricated in two parts, 40a and 40b, with an annular groove in the threaded part 40b in order to secure an annular washer 40c between them with flexible ears protruding out to close air passages 50 During the intake stroke of the cylinder, the difference in actual pressure created by the piston will cause the flexible ears to be pulled away from the air passage 50. Then during the following compression stroke, the flexible ears close the air passages 50 and remain closed during the power stroke and the following exhaust stroke. When the parts 40a and 40b are assembled, they may be welded together in an annular seam 40d.

The connecting rod 42 has an axial passage 46 for EGR, and the porcelain insulator 41 is made with an annular groove 47 which provides a chamber for passage of fluid around a spring-loaded shut-off valve 48 and through holes in the platinum sleeve 43a in the area of the chamber 47 into the engine cylinder past the electrode 43. Thus, during an intake stroke, the valve 48 opens to introduce into the cylinder a column of EGR. (The spark plug is placed at or near the center, i.e., on or near the axis of the cylinder.) At all other times, a spring 49 assures the EGR valve is closed, although it is evident that during the compression stroke, power stroke and exhaust stroke, the spring-loaded valve 49 will be held closed by greater internal pressure of the cylinder.

During the intake stroke, air is introduced through a plurality of passages 50 through the first part 40a of the metal shell. The second part 40b of the metal shell is beveled to assure the flexible ears of the annular washer 40c will be free to open the air passages into space between the porcelain insulator 41 and the second part 40b of the metal shell. To further assure uniform distribution of fresh air into that space, an annular groove 51 is provided opposite the beveled corner of the second part 40b of the metal shell. The threaded end of the metal part 40b which surrounds the gap 45 is provided with a cylindrical very near the porcelain insulator 41. This provides a spiral passage for air progressing from the air passages 50 into and through the passage between the metal part 40b and the porcelain insulator 41 at the gap end of the spark plug. Meantime, the fuel-air mixture is introduced through the conventional intake valve of a four-stroke cycle engine.

The third embodiment of FIG. 8 may also be used for fuel injection by connecting the injection fuel line to the axial passage 46 and modifying the spring 49 to compensate for the higher pressures of fuel injection systems, typically 75 psi, but in some engines very high fuel pressures are expected. In that case, EGR may be introduced through a CCS device as shown in FIG. 2 comprising a fresh air conduit with a coaxial EGR tube with a spiral fin press fitted into the conduit. It could also be used in a two-cycle engine shown diagrammatically in FIG. 9a.

Figure 9A:
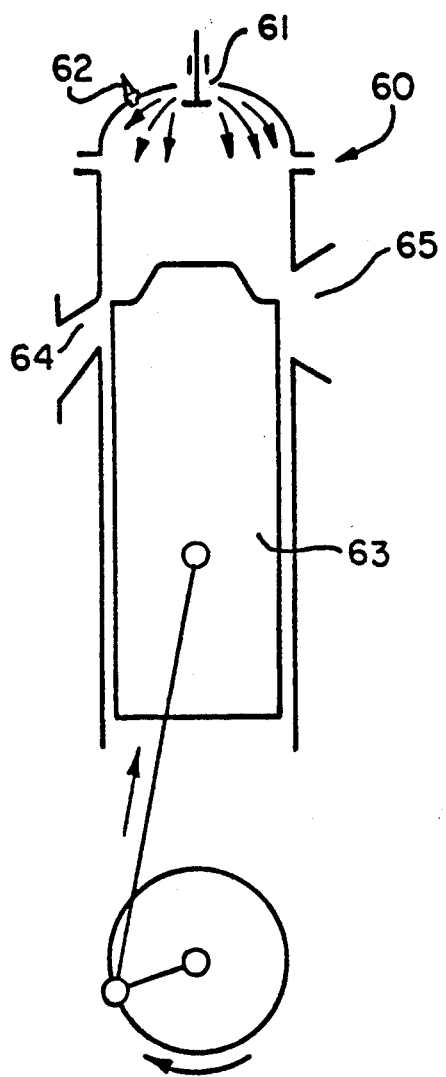
FIG. 9a illustrates diagrammatically a two-stroke-cycle internal combustion engine which may use a spiral charge system of the present invention.

Referring to FIG. 9a, a two-stroke cycle engine is illustrated diagrammatically with a fuel injection valve 61 at the center of the cylinder head and a spark plug 62 to one side. This engine has been used by Clark Bros. Co., Inc. of Olean, N.Y. for at least three or four score of years to power Clark compressors built specifically to compress petroleum, gas and chemicals.

The two-stroke cycle engine features a fuel injection system and low pressure scavenging of exhaust gases. As shown in the diagrammatic drawing of FIG. 9a, the piston 63 has begun a compression stroke, closing first an intake port 64 and then an exhaust port 65. Fuel (gas) is injected through the valve 61 into the cylinder where it is mixed with fresh air through the port 64. Note that prior to fuel injection, the fresh air sweeps all of the exhaust gases out of the port 65, and the port 65 is closed as the piston continues in its compression stroke. Once the port 65 is closed, the fuel is injected and, as the compression stroke progresses, mixed with the fresh air now trapped in the cylinder. Near the top of the compression stroke, the spark plug 62 ignites the air-fuel mixture. The ignited and expanding air-fuel charge drives the piston down for a power stroke near the end of which port 65 is opened to exhaust the burned gases, and shortly after the exhaust port begins to open, tie air inlet port begins to open to admit a charge of fresh air. Once the piston passes bottom dead center, a new cycle is begun.

Figure 9B:
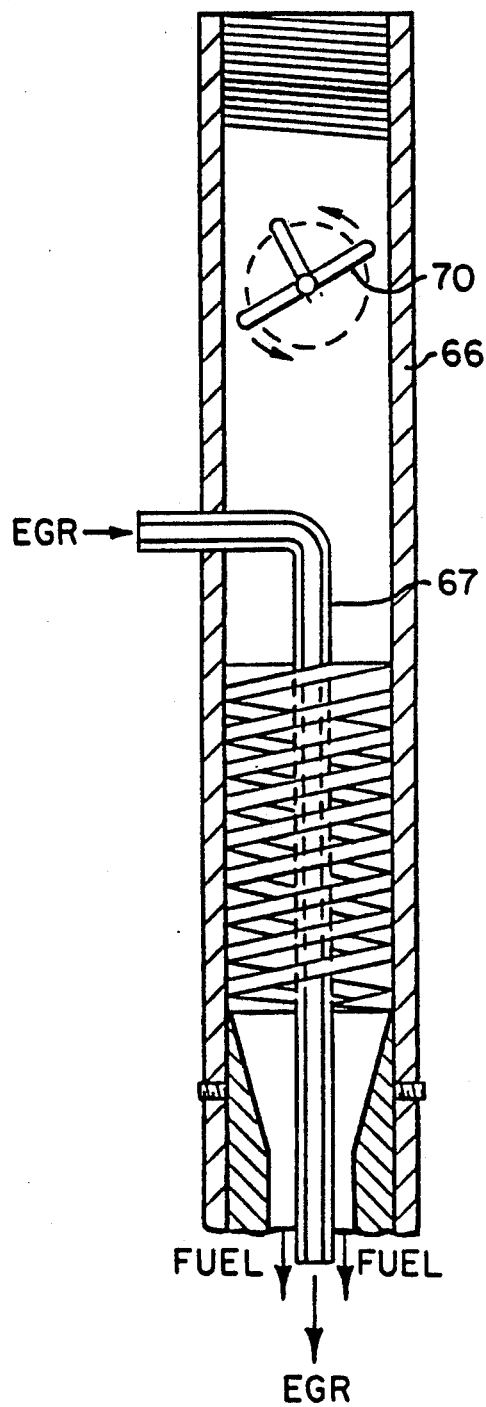
FIG. 9b illustrates in greater detail the cylinder charge system device used.

FIG. 9b illustrates the CCS device to be used with the two-stroke cycle engine of FIG. 9a. It comprises a conduit 66 for fuel (natural gas) and a concentric tube 67 for injecting a column of EGR. The tube 67 is provided with a spiral fin 68 to impart a spin on the fuel. The end of the exit conduit 66 is equipped with a venturi insert 69 to increase the velocity of the spirally spinning fuel. The column of EGR is thus sheathed with spirally spinning fuel in the second zone as it enters the cylinder. There the spinning fuel edge blends with the charge of fresh air already in the cylinder. The spark plug to one side of the CCS device ignites the air-fuel mixture as the piston approaches top dead center, even as the fuel continues to mix with the charged air, and the mixture is compressed. An optional valve 70 at the input end of the device functions as a flow control system downstream from the standard time fuel injection valve. Following each timed fuel injection, the optional valve closes the conduit to prevent any loss of fuel during the compression stroke and any exhaust gases from entering the fuel line during the power stroke. Additional air may be injected with the fuel through passages with check valves in the venturi 69 to enhance mixing of the fuel with edge blending.

Figure 10A:
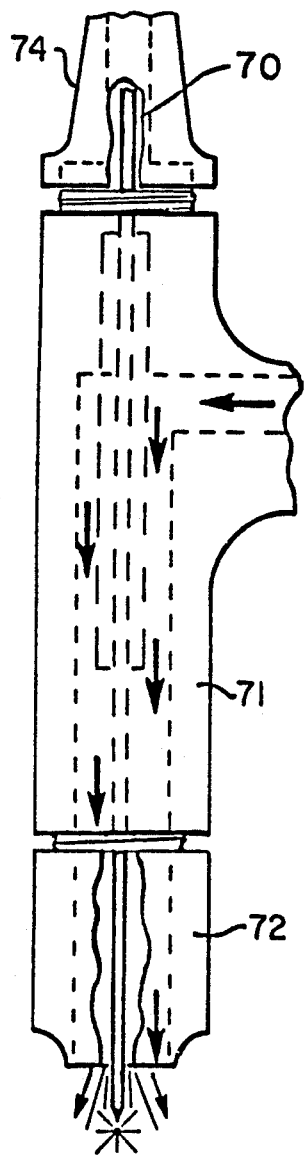
FIGS. 10a and 10b illustrate diagrammatically application of a spiral spin sheathing system of the present invention to MIG and TIG heliarc welding, respectively.
Figure 10B:
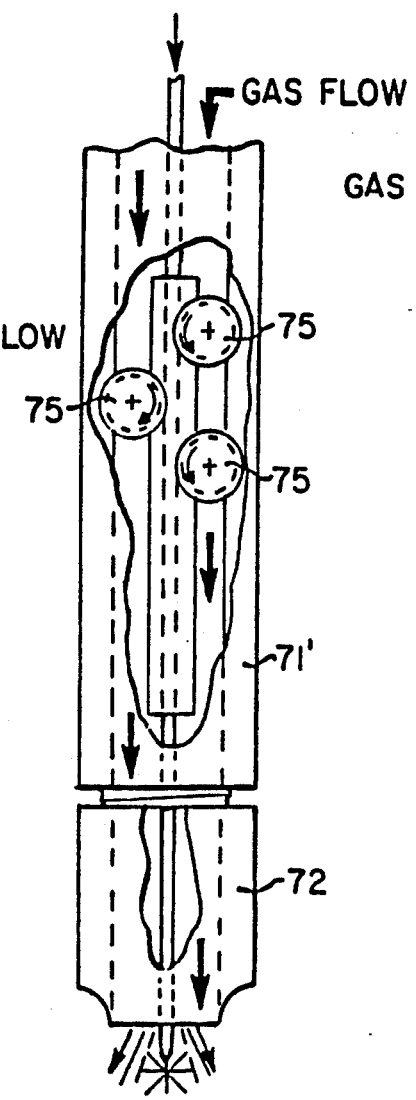
Figure 10C:
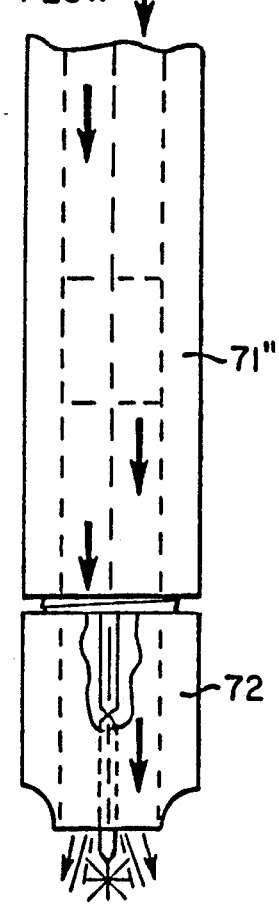
FIG. 10c illustrates diagrammatically beam (laser, electron, particle) or gas (torch) welding, using an inert gas to surround the welding point or site.

The device for imparting a spiral spin on a fluid may be used for sheathing TIG, MIG, beam or gas heat source while welding. As illustrated in FIG. 10a for TIG heliarc welding, a solid tungsten electrode 70 protrudes from a holder 71 and cup 72 along the axis of a conduit for inert gas. Electrical power applied to the electrode produces an electric arc between the electrode and the point of operation or workpiece. The heat of the arc causes metal to melt in a spot centered under the rod. The inert gas flooding the area around the rod isolates the area around the rod. In place of the tungsten rod and a cap 74, it is possible to insert a moving metal rod which melts for fusing with molten metal during heliarc welding, as shown in FIG. 10b. Thus, by modifying the holder 71 with feed rollers 75, the welding device may be caused to continually feed the metal rod 70' as it is consumed in the welding process. MIG welding is otherwise the same as TIG welding. Instead of the tungsten or metal electrode, it is possible to use a device using a holder 71" modified to pass a beam (laser, electron or particle) as a heat source for welding, as shown in FIG. 10c. In this, as in the other cases, an inert gas through the holder is customarily used to flood the area of the weld to prevent contamination of the weld metal.

Figure 10D:
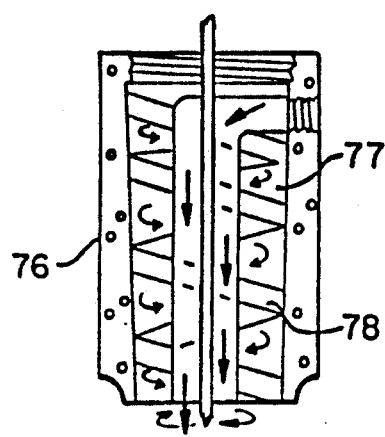
FIG. 10d illustrates in greater detail a spiral spin device for use in the application illustrated in FIG. 10a, 10b and 10c.

A device 76 of the present invention shown in FIG. 10d replaces the standard gas cup 72 in each of the cases illustrated in FIGS. 10a, b and c has a conduit 77 for a second source of inert gas. It is provided with a passage for the axial heat source (electrode, beam or gas) and has a spiral fin 78 for holding the inert gas conduit 77.

Within the cylindrical cup 76, the spiral fin thus creates a spiral path for the main flow of inert gas which imparts a spiral spin for sheathing the axial heat source from the cup down to the surface of the workpiece. This not only provides more perfect isolation, but because of the spiral spin allows the welding device to be held with the heat source guide further from the workpiece if necessary without violation of the desired isolation. The inert gas passing through the conduit 77 that floods the workpiece within zone 1 may be combined with metallurgical enhancing material, such as particulate flux or particulate matter such as coal dust or carbide. The spirally spinning inert gas in zone 2 isolates such metallurgical enhancing material from the surrounding area (zone 3).

In the case of a gas heat source, such as acetylene, inert gas in zone 2 to sheath the flame to its tip and, if desired, upon increasing the velocity of the spirally spinning inert gas, to also extend the distance between the end of the cup 76 for the gas and the tip of the flame. In this, as in all other industrial applications described above, it is possible to introduce particulate flux, coal dust, or carbide for conventional purposes while isolating the weld, or cut, from contamination by particles of gases of some other source.

Although particular embodiments of the invention have been described and illustrated herein, it is recognized that modifications and variations may readily occur to those skilled in the art. Consequently, it is intended that the claims be interpreted to cover such modifications and equivalents.

We claim:

1. Apparatus for sheathing a columnar first zone from fluid in a third zone with a sheathing fluid in an annular second zone comprising
    means for imparting a spiral spin to said sheathing fluid and
    means for causing said spirally spinning sheathing fluid to flow in said annular second zone around said columnar first zone, thereby sheathing said columnar first zone from said fluid in said third zone surrounding said annular second zone.

2. Apparatus as defined in claim 1 wherein said sheathing fluid in said second zone is an inert gas.

3. Apparatus as defined in claim 2 wherein said columnar first zone contains a selected one of a group consisting of a reactant and an oxidizer, and said third zone contains a nonselected one of said group consisting of a reactant and an oxidizer.

4. Apparatus as defined in claim 2 wherein said columnar first zone contains a heat source.

5. Apparatus as defined in claim 4 wherein said heat source in said columnar first zone is a metal electrode.

6. Apparatus as defined in claim 4 wherein said heat source in said columnar first zone is a beam.

7. Apparatus as defined in claim 6 wherein said beam heat source is a laser beam.

8. Apparatus as defined in claim 6 wherein said beam heat source is a particle beam.

9. Apparatus as defined in claim 8 wherein said particle beam heat source is an electron beam.

10. Apparatus as defined in claim 4 wherein said heat source in said columnar first zone is a combustible gas.

11. Apparatus as defined in claim 2 wherein said sheathing fluid in said annular second zone includes metallurgical enhancing material.

12. Apparatus as defined in claim 11 wherein said metallurgical enhancing material in said sheathing fluid is a flux.

13. Apparatus as defined in claim 12 wherein said metallurgical enhancing material in said sheathing fluid is a nonferrous enhancer.

14. Apparatus as defined in claim 12 wherein said metallurgical enhancing material in said sheathing fluid is a ferrous enhancer.

15. Apparatus as defined in claim 1 for an internal combustion engine having at least one cylinder, wherein said annular second zone is surrounded by said third zone in a passageway leading to an intake port of said one cylinder, said passageway carrying a fuel-air mixture.

16. Apparatus as defined in claim 1 for an internal combustion engine having at least one cylinder, wherein said annular second zone and columnar first zone are coaxially injected together with said spirally spinning sheathing fluid surrounding said columnar first zone, and exhaust gas return in said columnar zone, and said cylinder is precharged with air prior to injecting said spirally spinning gas sheathing said columnar zone whereby said exhaust gas return injected together with said spirally spinning sheathing fluid is sheathed from said air in said third zone.

17. In a cylinder charge system for an internal combustion engine in which fuel, fresh air and exhaust gas recirculation are introduced separately into a cylinder having a piston for a blended mixture of fuel and air surrounding an column of exhaust gas return comprising
    a conduit for a fluid selected from said fuel and fresh air,
    a coaxial tube within said conduit connected to a source of exhaust gas return from said internal combustion engine,
    means for providing a spiral channel between said tube and said conduit, thereby to create a spiral spin in said fluid flowing through said conduit to sheath said exhaust gas return entering said engine cylinder as said spirally spinning fluid enters said engine cylinder for blending said fuel with air in said cylinder, and
    means for introducing into said cylinder a fluid, whichever of said fuel and fresh air is not selected.

18. In a cylinder charge system as defined in claim 17 wherein
    said fluid selected from fuel and fresh air is chosen to be fresh air,
    said means for introducing said fuel into said cylinder is a passageway from a fuel-air manifold to an intake manifold, and
    said conduit is coaxially positioned in said passageway proximate an intake port.

19. In a cylinder charge system as defined in claim 18 wherein said internal combustion engine is a four-stroke cycle engine, and said intake port is opened by a valve only during an intake stroke and closed during all other strokes.

20. In a cylinder charge system as defined in claim 17 wherein
    said fluid selected from fuel and fresh air is chosen to be fuel injected with exhaust gas return during an intake stroke after an exhaust port has been opened,
    said means for introducing fresh air into said cylinder is an intake port opened near the beginning of an intake stroke after said exhaust port is closed.

21. In a cylinder charge system as defined in claim 20 wherein said internal combustion engine is a two-stroke cycle engine, and said intake port is opened by said piston near the end of a power stroke after said exhaust port has been opened and closed near the beginning of a compression stroke after said intake port is closed, and including means for timing fuel and exhaust gas return injection after said intake port and said exhaust port are closed by said piston.

22. In a cylinder charge system for an internal combustion engine, a separate device for each cylinder placed in the intake passageway for an air-fuel mixture at or near an intake port of each cylinder comprising a fresh-air intake conduit coaxially positioned in said intake passageway so that air-fuel mixture envelopes a flow of fresh air emerging from said conduit, a coaxial tube within said fresh-air conduit connected to a passageway of exhaust gas return from said internal combustion engine, and means for providing a spiral channel between said tube and said fresh-air conduit, thereby to create a spiral spin in said fresh air flowing out of said fresh air conduit to sheath said exhaust gas return into said engine cylinder from said air-fuel mixture as said spirally spinning air and exhaust gas recirculation enters said cylinder through said port together with fuel-air mixture surrounding said spirally spinning air.

23. In a cylinder charge system for an internal combustion engine, a device for each cylinder for introducing fuel to be mixed with fresh air precharged in said cylinder, said cylinder being precharged with fresh air through an intake port, said device comprising a conduit for introducing fuel into said cylinder, a coaxial tube within said fresh-air conduit connected to a source of exhaust gas recirculation from said internal combustion engine, and means for providing a spiral channel between said tube and said fuel conduit, thereby to create a spiral spin in said fuel out of said fuel conduit to sheath said exhaust gas return entering said engine cylinder as said spirally spinning fuel and exhaust gas recirculation enters said engine cylinder for blending said fuel with said air in said cylinder during a compression stroke of said cylinder.

* * * * *